(12) United States Patent
Toivonen et al.

(10) Patent No.: US 9,940,766 B2
(45) Date of Patent: Apr. 10, 2018

(54) LOCK ARRANGEMENT AND METHOD FOR DETECTING THE PRESENCE AND LOCATION OF A DEVICE SENDING A RADIO SIGNAL

(71) Applicant: ROLLOCK OY, Espoo (FI)

(72) Inventors: Timo Toivonen, Helsinki (FI); Hannu Kankkunen, Espoo (FI); Aku Petteri Juola, Vuokatti (FI); Petri Ingalsuo, Kuluntalahti (FI)

(73) Assignee: ROLLOCK OY, Espoo (FI)

( * ) Notice: Subject to any disclaimer, the term of this patent is extended or adjusted under 35 U.S.C. 154(b) by 0 days.

(21) Appl. No.: 15/026,499

(22) PCT Filed: Sep. 29, 2014

(86) PCT No.: PCT/FI2014/050740
§ 371 (c)(1),
(2) Date: Mar. 31, 2016

(87) PCT Pub. No.: WO2015/049417
PCT Pub. Date: Apr. 9, 2015

(65) Prior Publication Data
US 2016/0240023 A1    Aug. 18, 2016

(30) Foreign Application Priority Data
Oct. 1, 2013    (FI) .................................... 20135981

(51) Int. Cl.
*G07C 9/00* (2006.01)
*H04W 4/00* (2009.01)
(Continued)

(52) U.S. Cl.
CPC ..... *G07C 9/00134* (2013.01); *G07C 9/00309* (2013.01); *H04B 5/00* (2013.01);
(Continued)

(58) Field of Classification Search
CPC ............ G07C 9/00; H04W 4/00; G05B 19/00
(Continued)

(56) References Cited

U.S. PATENT DOCUMENTS 6,005,306 A     12/1999  Pickard
6,522,027 B1 *   2/2003  Morillon ............... B60R 25/245
                                                       307/10.1
(Continued)

FOREIGN PATENT DOCUMENTS

WO    WO 2012/174387 A2    12/2012

OTHER PUBLICATIONS

International Search Report, issued in PCT/FI2014/050740, dated Jan. 12, 2015.
(Continued)

*Primary Examiner* — Nam V Nguyen
(74) *Attorney, Agent, or Firm* — Birch, Stewart, Kolasch & Birch, LLP

(57) ABSTRACT

Lock arrangement and method for detecting the presence and location of a device sending a radio signal, which lock arrangement includes a lock case that can be fixed into a door, which lock case includes a locking latch and a latch mechanism. The lock arrangement further includes at least two antennas fitted into connection with the lock arrangement and a device for receiving radio signals connected to the antennas. The lock arrangement is able to determine on the basis of the signals measured from the antennas on which side of the lock arrangement the device sending a radio signal is located.

18 Claims, 5 Drawing Sheets

(51) Int. Cl.
- *G05B 19/00* (2006.01)
- *G06K 5/00* (2006.01)
- *H04W 12/08* (2009.01)
- *H04W 48/04* (2009.01)
- *H04B 5/00* (2006.01)
- *H04B 7/08* (2006.01)
- *H01Q 1/22* (2006.01)
- *E05B 47/00* (2006.01)
- *H04W 84/12* (2009.01)

(52) U.S. Cl.
CPC ............ *H04B 7/086* (2013.01); *H04W 4/008* (2013.01); *E05B 2047/0059* (2013.01); *E05B 2047/0096* (2013.01); *G07C 2009/00634* (2013.01); *G07C 2209/63* (2013.01); *H01Q 1/22* (2013.01); *H04W 84/12* (2013.01)

(58) Field of Classification Search
USPC ......... 340/5.61, 5.6, 5.63, 5.64, 5.7; 70/277, 70/278.1, 280–282; 361/172; 235/382, 235/382.5
See application file for complete search history.

(56) References Cited

U.S. PATENT DOCUMENTS

| | | | | |
|---|---|---|---|---|
| 7,548,151 B2* | 6/2009 | Roosli | ..................... | E05B 47/00 340/5.6 |
| 8,186,585 B2* | 5/2012 | Popowski | ............... | E05B 47/06 235/380 |
| 8,264,323 B2* | 9/2012 | Chandler, Jr. | ...... | G07C 9/00174 340/5.7 |
| 8,354,914 B2* | 1/2013 | Buckingham | ........... | E05B 47/00 340/5.6 |
| 8,772,970 B2* | 7/2014 | Lambrou | ................ | E05B 47/02 307/104 |
| 9,007,173 B2* | 4/2015 | McIntyre | ........... | G07C 9/00309 340/5.6 |
| 9,196,104 B2* | 11/2015 | Dumas | ................ | G07C 9/00571 |
| 2003/0098777 A1* | 5/2003 | Taylor | ................ | G07C 9/00103 340/5.61 |
| 2003/0224818 A1* | 12/2003 | Nagasaka | ............. | B60R 25/102 455/550.1 |
| 2004/0068935 A1* | 4/2004 | Ichikawa | ................ | E05B 85/01 49/25 |
| 2004/0183652 A1* | 9/2004 | Deng | ................. | G07C 9/00563 340/5.53 |
| 2009/0025435 A1 | 1/2009 | Popowski | | |
| 2010/0290542 A1 | 11/2010 | Peabody et al. | | |
| 2013/0237193 A1 | 9/2013 | Dumas et al. | | |
| 2013/0241694 A1 | 9/2013 | Sharma et al. | | |
| 2014/0070943 A1* | 3/2014 | Breed | ..................... | E05F 15/43 340/539.11 |
| 2015/0070136 A1* | 3/2015 | Kameyama | ............. | B60R 25/20 340/5.72 |

OTHER PUBLICATIONS

Written Opinion of the International Searching Authority, issued in PCT/FI2014/050740, dated Jan. 12, 2015.

* cited by examiner

LOCK ARRANGEMENT AND METHOD FOR DETECTING THE PRESENCE AND LOCATION OF A DEVICE SENDING A RADIO SIGNAL

FIELD OF THE INVENTION

The invention relates to a lock arrangement and to a method for detecting the presence and location of a device sending a radio signal.

BACKGROUND OF THE INVENTION

Known in the art are door locks comprising a lock case and a locking latch, which door locks can be opened and closed mechanically. Also known in the art are electrical locks, which can be controlled to open and close by means of electrical commands and electrical opening means. In prior-art arrangements electrical locks can be adapted to receive opening commands and closing commands also wirelessly, e.g. by means of Bluetooth or WLAN.

In prior-art locks, which are controlled wirelessly, the locks are able to detect the presence of a device sending a radio signal and by means of this to control the lock e.g. to open. Prior-art locks detecting devices sending radio signals detect only the presence of a device sending a radio signal in the proximity of the lock, but do not detect e.g. on which side of the lock the device sending a radio signal is located. That being the case, in prior-art solutions the lock is controlled wirelessly with devices sending a radio signal in the same way inside of the door and outside of the door, and the location of the device on the inside or outside of the door cannot be taken into account. This is a problem e.g. in situations in which a lock is opened automatically when a device sending a radio signal is in the proximity of the lock. Automatic opening can be used e.g. when a user of a device arrives at a door and in this case the lock is opened when the device arrives in the proximity of the lock. When the user has stepped inside through the door, the door can again be locked. Since prior-art locks are not able to detect anything but the presence of a device, the lock is opened automatically again if the user goes into the proximity of the lock with a device sending a radio signal on the inside of the door, e.g. in his/her home. Thus the lock is opened unnecessarily even though the user would not want to go outside through the door. In prior art solutions e.g. the automatic opening of a lock therefore functions both outside and inside of the door, although this is not actually the aim.

BRIEF DESCRIPTION OF THE INVENTION

The aim of the current invention is to achieve a new type of lock arrangement that is able to detect the location of a device sending a radio signal in relation to the lock.

The lock arrangement according to the invention detects the presence and location of a device sending a radio signal. The lock arrangement comprises a lock case that can be fixed into the door, which lock case comprises a locking latch and a latch mechanism. The lock arrangement further comprises at least two antennas fitted into connection with the lock arrangement and means connected to the antennas for receiving radio signals. The apparatus is adapted to determine on the basis of the signals measured from the antennas on which side of the lock the device sending a radio signal is located.

In one embodiment of the invention the lock arrangement is adapted to communicate with the device sending a radio signal and to receive requests from the device sending a radio signal.

In one embodiment of the invention the antennas are, disposed on opposite sides of the lock arrangement and the antennas are directional antennas, in which the front-to-back ratio of the antenna is high. In one embodiment of the invention the antennas are aligned in such a way that one of the radiation lobes is aligned to one side of the lock arrangement and the other radiation lobe is aligned in the opposite direction to the other side of the lock arrangement, in which case the radiation lobes of the antennas in the lock arrangement installed in connection with a door are aligned to opposite sides of the door.

In one embodiment of the invention the antennas and/or the means for receiving a radio signal are arranged into connection with the lock case, on both sides of the lock case.

In one embodiment of the invention the lock arrangement further comprises a counterpart of the lock, i.e. a striking plate, which can be installed in a door frame. In this embodiment the antennas and/or the means for receiving a radio signal can be arranged into connection with the counterpart of the lock.

In one embodiment of the invention, in which the lock arrangement comprises a counterpart of the lock, means for wirelessly sending electrical power to the lock case and/or into connection with the lock case are arranged in connection with the counterpart of the lock, and means are arranged in connection with the lock case for wirelessly receiving electrical power from the means for sending electrical power that are arranged in connection with the counterpart of the lock. Electrical power is configured to be transmitted from the means of the counterpart of the lock that are for sending electrical power to the means of the lock case that are for receiving electrical power, when the lock case and the counterpart of the lock are at a certain distance from each other, i.e. when, for example, the door is closed. The electrical power received is conducted to the antennas, to the means for receiving a radio signal, to the electronics of the lock and/or to the electrical means for opening and/or closing the locking latch. The means for receiving and for sending electrical power can also be arranged to transfer encrypted information relating to the operation of the lock.

In one embodiment of the invention the information to be transferred between the device sending a radio signal and the lock arrangement is encrypted before sending it from the device sending a radio signal to the lock arrangement. In this way external systems are not able to read or produce corresponding information. The information can be, for example, a control command of the lock, a request for opening or closing the lock, or status information of the lock.

The solution according to the invention now being presented has some significant advantages when it is compared to prior-art solutions. By means of the solution according to the invention the location of a device sending a radio signal in relation to the lock can be taken into account in the operation of the lock, e.g. on which side of the lock, and consequently of the door, the device sending a radio signal is. The lock arrangement according to the invention can be adapted to perform different functions for the devices on a different side. This is useful in many situations and e.g. different rights can be given to devices on different sides of the door. The arrangement according to the invention can be used e.g. in the automatic opening of a lock when a device sending a radio signal is in the proximity of the lock. Automatic opening can be used e.g. when a user of a device arrives at a door and in this case the lock is opened when the device arrives in the proximity of the lock. Since the arrangement according to the invention detects the location of a device in relation to the lock, the lock can be adjusted to open automatically e.g. when a user arrives inside from a door with a device. When the user is detected inside of the door with a device, the lock of the door no longer need to open unnecessarily by means of the automatics because the user might walk past the door and the lock without wanting to go out through the door. In this situation the user can open the lock from inside conventionally, e.g. with a door handle. Additionally, by means of the arrangement according to the invention it is possible to detect the direction of travel of people traveling via or past a door, and consequently how many devices sending a radio transmission have passed inside from the door and out from the door.

BRIEF DESCRIPTION OF THE FIGURES

In the following, the invention will be described in more detail by the aid some examples of its embodiment with reference to the drawings 1-5, wherein.

DETAILED DESCRIPTION OF THE INVENTION

Figure 1:
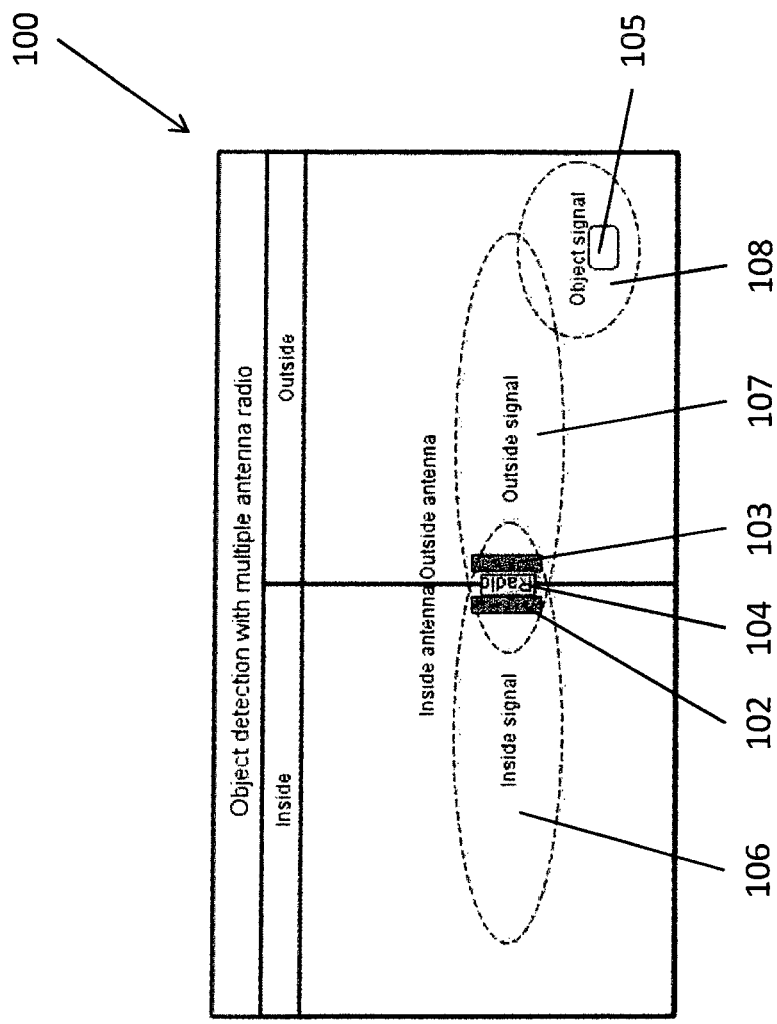
FIG. 1 presents a schematic view of the operating principle of one embodiment of the invention.

FIG. 1 presents a schematic view of the operating principle of one embodiment of the invention. In the schematic view is a lock arrangement 100 for detecting the presence and location of a device sending a radio signal. The lock arrangement comprises a lock case that can be fixed into a door, which lock case comprises a locking latch and a latch mechanism. These are not presented in FIG. 1. The lock arrangement further comprises at least two antennas 102, 103 fitted into connection with the lock arrangement and means 104 connected to the antennas for receiving radio signals, by the aid of which the lock arrangement is adapted to communicate with a device 105 sending a radio signal and to receive requests from a device 105 sending a radio signal. The apparatus is also adapted to determine on the basis of the signals measured from the antennas 102, 103 on which side of the lock the device 105 sending a radio signal is located.

The antennas 102, 103 are directional antennas, in which the front-to-back ratio of the antenna is high and the antennas are aligned in such a way that one of the radiation lobes 106 is aligned to one side of the lock and the other radiation lobe 107 is aligned in the opposite direction to the other side of the lock. The radiation lobes of the antennas 102, 103 in the lock arrangement installed in connection with a door are aligned to opposite sides of the door. The antennas 102, 103 can be disposed e.g. on opposite sides of the lock case or on opposite sides of the counterpart of the lock. FIG. 1 also presents the range 108 of a radio transmission of a device 105 sending a radio signal.

The means 104 for receiving radio signals is adapted to compare the level of the signals received from the different antennas 102, 103 and by means of this to determine the location of the device 105 sending a radio signal in relation to the lock arrangement. The means 104 for receiving a radio signal can be a transmitter-receiver, and the device 105 sending a radio signal and the transmitter-receiver can use WLAN technology and/or Bluetooth technology and/or another short-range radio technology as a wireless radio technology.

Figure 2:
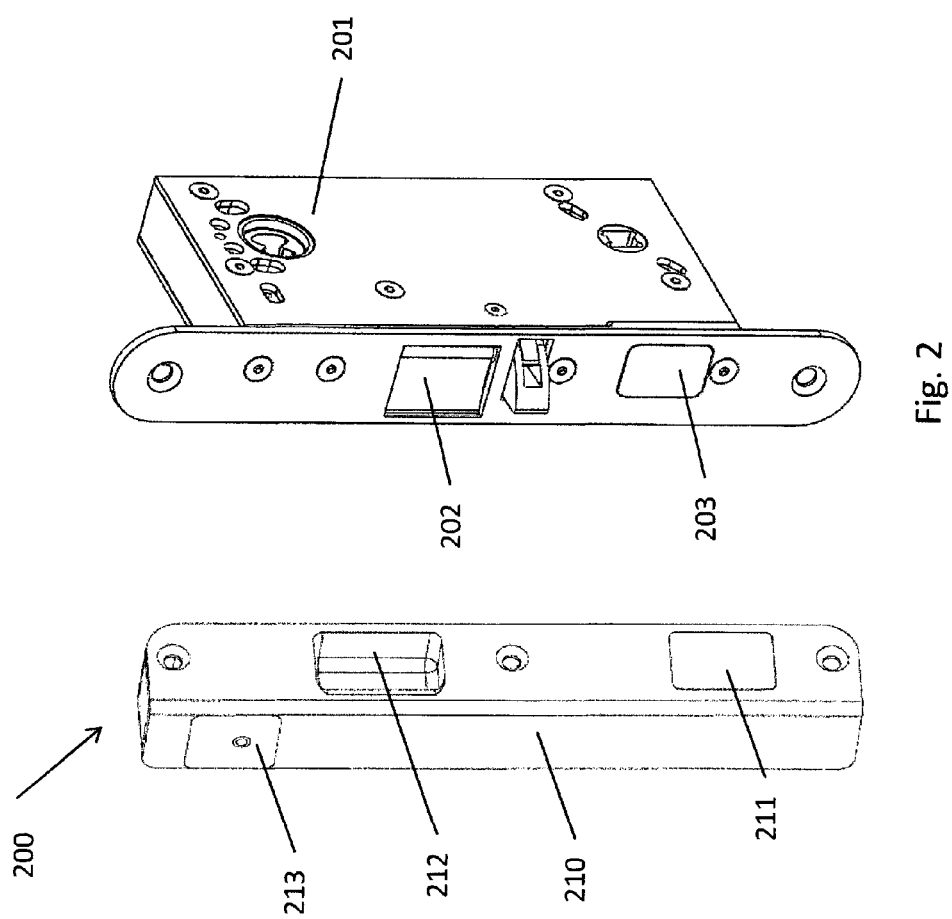
FIG. 2 presents the structure of a lock arrangement according to one embodiment of the invention, which lock arrangement comprises a lock case and a counterpart of the lock and in which the antennas are in connection with the counterpart of the lock.

FIG. 2 presents by way of example the structure of a lock arrangement according to one embodiment of the invention. The lock arrangement comprises a lock case 201 and a counterpart 210 of the lock. The lock case 201 comprises a locking latch 202 and a latch mechanism. The latch mechanism comprises electrical means for opening and/or closing the locking latch. In one embodiment of the invention means 203 can be arranged into connection with the lock case 201 for wirelessly receiving electrical power from the means 211 for sending electrical power that are arranged into connection with the counterpart of the lock.

Figure 3:
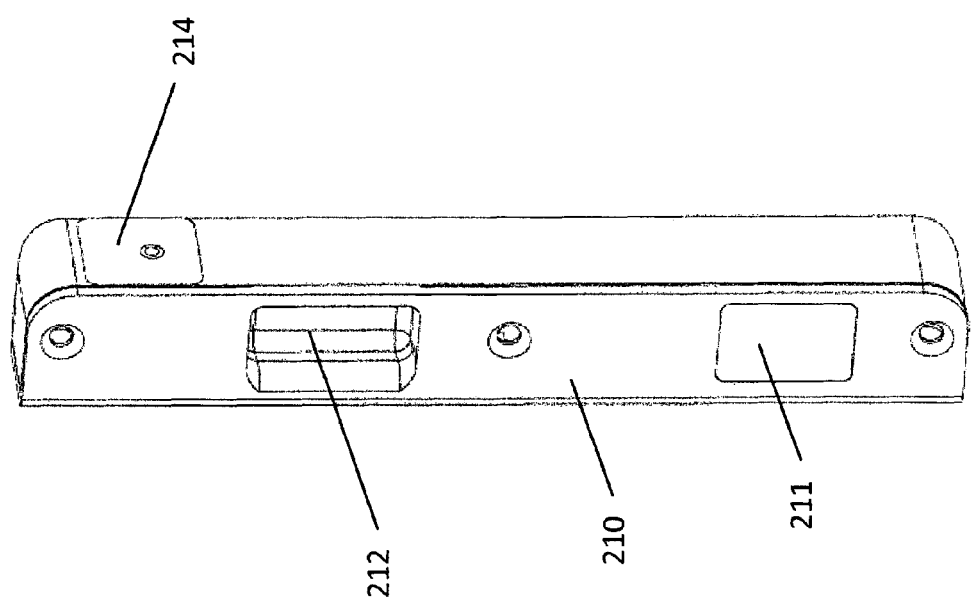
FIG. 3 presents counterpart of the lock presented in FIG. 2 from a second direction.

The counterpart 210 of the lock presented in FIG. 2 comprises an aperture 212 for the locking latch of the lock. Arranged into connection with the counterpart 210 of the lock are two antennas, a first antenna 213 and a second antenna, and means for receiving radio signals connected to the antennas, by the aid of which means the lock arrangement is adapted to determine on the basis of the signals measured from the antennas on which side of the lock the device sending a radio signal is located. FIG. 2 presents only the first antenna 213. FIG. 3 presents the counterpart 210 of the lock of FIG. 2 from a second angle, in which case the second antenna 214 can be seen. The second antenna 214 is thus situated in a corresponding location to the antenna 213 but on the opposite side of the counterpart 210 of the lock. In one embodiment of the invention the counterpart 210 of the lock can also comprise means 211 for sending electrical power. The counterpart 210 of the lock can be fixed into the door frame at a point corresponding to the lock of the door, and wiring to the counterpart 210 of the lock is arranged via the door frame.

The means for receiving 203 and for sending 211 electrical power can be coils in the solution according to the invention. A lock environment is characteristically narrow and high in structure. The electronics used in the arrangement according to the invention can be disposed inside the lock to some extent more freely than the coils that transfer power—the coils, on the other hand, must be brought close to each other on the front surfaces of the lock and of the counterpart. The coils can be implemented to be planar in structure (planar coils). The means for receiving and for sending electrical power can be implemented in the manner described in patent application FI20135636. The lock arrangement can be adapted to transmit a signal of the antennas, and/or a signal formed by the means receiving a radio signal, from the counterpart 210 of the lock to the lock case 201 via the means adapted for sending 211 and receiving 203 electrical power.

Figure 4:
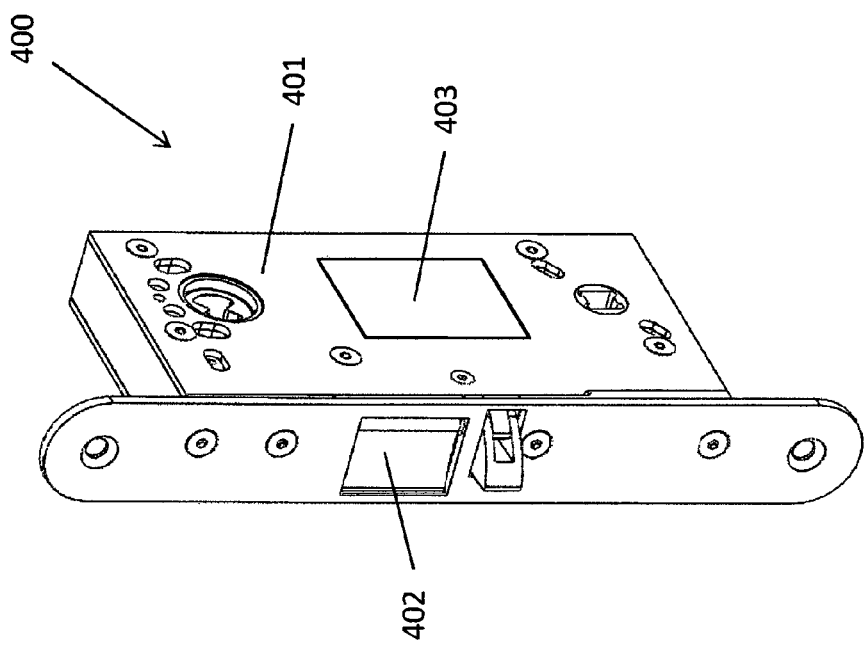
FIG. 4 presents the structure of a lock according to one embodiment of the invention, in which the antennas are in connection with the lock case.

FIG. 4 presents by way of example the structure of a lock arrangement 400 according to one embodiment of the invention. The lock comprises a lock case 401, which lock case comprises a locking latch 402 and a latch mechanism. The latch mechanism comprises electrical means for opening and/or closing the locking latch. Arranged into connection with the lock case 401 are two antennas, a first antenna 403 and a second antenna, and means for receiving radio signals connected to the antennas, by the aid of which means the lock arrangement is adapted to determine on the basis of the signals measured from the antennas on which side of the lock the device sending a radio signal is located. The figure presents only the first antenna 403. The second antenna is situated in a corresponding location (not presented in the figure) on the opposite side of the lock.

In one embodiment of the invention the lock arrangement functions mechanically and the mechanical lock can also be opened and/or closed electrically.

In the arrangement according to the invention information can be wirelessly sent between the lock arrangement and a device sending a radio signal. The information can be, for example, requests for opening or closing the lock. The information transfer can be implemented by the aid of the antennas and of the means used for receiving radio signals.

In the solution according to the invention the information transfer is digital and authentication methods and/or encryption methods to ensure data security can be used in a lock application, by means of which methods it is ensured that the lock reacts only to commands transmitted by an identified counterpart. An unauthorized device that does not know the correct encryption parameters cannot create or send to the lock a request in an acceptable format and therefore cannot mislead the lock into switching to the incorrect operating mode.

The aim of authentication is therefore to ensure that the devices communicating with each other identify one another. In this way, a fraudulent device cannot control the other device. Likewise the transmission of information to a fraudulent device is prevented. Authentication can be performed before permitting use of the service. Authentication can be one-way (server identifies user) or two-way (the service identifies user, and the user the service).

After successful authentication, information, which is encrypted, can be transferred between the lock arrangement and the device sending a radio signal. Various encryption technologies used in telecommunications or in computers can be used as encryption methods for encrypting the messages of the information transfer. Encryption means the converting of the plain text information to be encrypted into a type of format that makes clarification of the original information either impossible or too expensive (i.e. breaking the encryption takes too much time or resources compared to the value of the encrypted information).

The handling of encrypted information is generally two-directional: the information to be encrypted can be converted into an unreadable format for encrypting the information and correspondingly the encrypted information can be returned back to the original format for utilizing it.

Examples of algorithms to be used for the encryption of the information are, inter alia, DES, AES and Blowfish.

Figure 5:
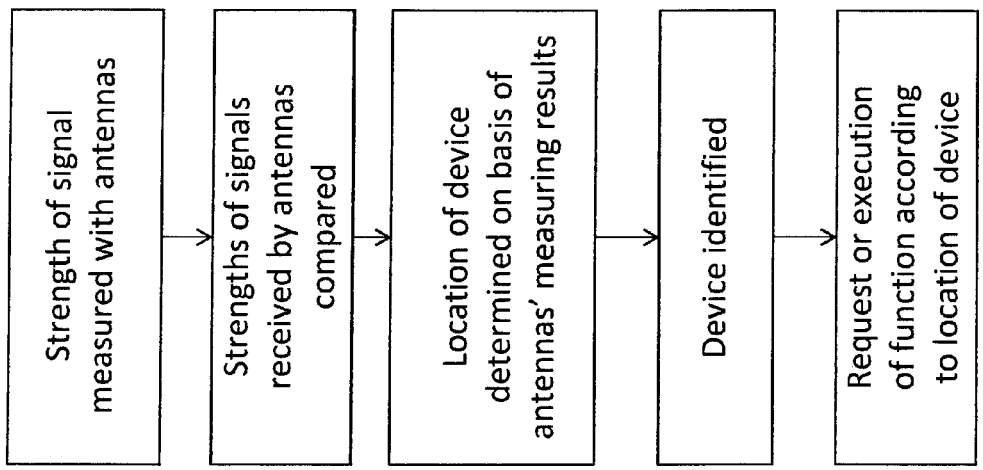
FIG. 5 presents as a functional diagram the operation of a lock arrangement according to one embodiment of the invention.

FIG. 5 presents the operation of a lock arrangement of one embodiment according to the invention, in a situation in which the lock in the door is closed. By means of the antennas and the transmitter-receiver that are in the lock, it is measured whether any devices sending a radio signal are in the vicinity. When a device sending a radio signal comes inside the measuring range of the lock, the strength of the signal is measured with both antennas separately and after this the lock arrangement compares the signals received by the antennas to each other. Since the antennas are aligned in different directions, a device sending a radio transmission can be interpreted as being on that side for which the antenna aligned towards produces the stronger signal. If, for example, a lock arrangement antenna having a radiation lobe aligned to inside a space provided with a door receives a stronger signal, the device sending the radio transmission can be interpreted as being inside the space, e.g. in a room or inside a home. If, for example, a lock arrangement antenna having a radiation lobe aligned to outside a space provided with a door receives a stronger signal, the device sending the radio transmission can be interpreted as being outside the space, e.g. outside the room or home.

Since the system was able to determine the location of the device sending a radio transmission in relation to the lock, the lock arrangement can activate different functions for use on different sides of the lock and consequently for the devices on different sides of the door in which the lock is installed, and for the users of said devices. Functions, such as automatic opening, can be switched on e.g. only for people coming from outside a space, such as room or home, and people moving inside the space do not give cause for automatic opening of the lock of the door.

When it is desired to open a door lock with automatic opening or by means of the actions of a user from a device sending a radio transmission, the device sending a radio signal sends a request to the lock of the door for opening the lock. Before sending a command over a wireless interface, the command can be encrypted. If encryption is used, the request can be sent after encryption from the device sending a radio signal to the lock arrangement, and the lock arrangement can receive the request utilizing the antennas of the lock arrangement and the means for receiving a radio signal. When the lock of the door receives the message, the encryption is decrypted and the content of the message interpreted. After this, the lock executes the command, in other words e.g. opens the lock, locks the lock, and/or sends the status information of the lock to the device sending a radio signal if the lock arrangement interprets the device sending a radio signal as having the right to present requests, i.e. the device sending a radio signal is identified. The aforementioned procedures do not need to be performed if it is not desired to automatically open the lock for devices that are inside a space, e.g. inside a home.

In one embodiment of the invention identification of a device sending a radio transmission can be performed before the detection of the location of the device sending a radio signal described above.

If information is sent from the lock arrangement to the device sending a radio signal, the system can function in such a way that the lock arrangement encrypts the message (e.g. its status information) and sends it utilizing its antennas and the transmitter-receiver. Correspondingly the device sending a radio signal receives the message. When the encryption of the message is decrypted in the device sending a radio signal, the content of the message can be read.

In one embodiment of the invention by means of the arrangement according to the invention it is possible to detect the direction of travel of people traveling via or past a door, and consequently how many devices sending a radio transmission, and consequently how many users, have passed inside from the door and out from the door. This data can be transmitted onwards, e.g. to an access control system.

The invention thus relates to a lock arrangement for detecting the presence and location of a device 105 sending a radio signal, which lock arrangement comprises a lock case 201, 401 that can be fixed into a door, which lock case 201, 401 comprises a locking latch 202, 402 and a latch mechanism. The lock arrangement further comprises at least two antennas 102, 103, 213, 214, 403 fitted into connection with the lock arrangement and means 104 for receiving radio signals connected to the antennas. The lock arrangement is adapted to determine on the basis of the signals measured from the antennas 102, 103, 213, 214, 403 on which side of the lock arrangement the device 105 sending a radio signal is located.

In one embodiment of the invention the lock arrangement is adapted to communicate with the device 105 sending a radio signal and to receive requests from the device 105 sending a radio signal.

In one embodiment of the invention the means 104 for receiving radio signals is a transmitter-receiver.

In one embodiment of the invention the antennas 102, 103, 213, 214, 403 are directional antennas, in which the front-to-back ratio of the antenna is high.

In one embodiment of the invention the lock arrangement further comprises a counterpart 210 of the lock and the antennas 102, 103, 213, 214 are arranged into connection with the counterpart 210 of the lock.

In one embodiment of the invention the lock arrangement further comprises means 211, arranged into connection with the counterpart 210 of the lock, for wirelessly sending electrical power to the lock case and/or into connection with the lock case 201 and means 203, arranged into connection with the lock case 201, for wirelessly receiving electrical power from the means 211 for sending electrical power that are arranged into connection with the counterpart of the lock.

In one embodiment of the invention the signals of the antennas 213, 214 and/or the information formed by the means 104 receiving a radio signal are adapted to be transmitted from the means 211 of the counterpart 210 of the lock that are for sending electrical power to the means 203 of the lock case 201 that are for receiving electrical power, when the lock case 201 and the counterpart 210 of the lock are at a certain distance from each other.

In one embodiment of the invention the antennas 102, 103, 403 are disposed on opposite sides of the lock case 401.

In one embodiment of the invention the antennas 102, 103, 213, 214, 403 are aligned in such a way that one of the radiation lobes 106 is aligned to one side of the lock arrangement and the other radiation lobe 107 is aligned in the opposite direction to the other side of the lock arrangement.

In one embodiment of the invention the radiation lobes 106, 107 of the antennas 102, 103, 213, 214, 403 in the lock arrangement installed in connection with a door are aligned to opposite sides of the door.

In one embodiment of the invention the means 104 for receiving radio signals is adapted to compare the level of the signals received from the different antennas 102, 103, 213, 214, 403 and by means of this to determine the location of the device 105 sending a radio signal.

In one embodiment of the invention the device 105 sending a radio signal uses WLAN technology, Bluetooth technology and/or another short-range radio technology.

In one embodiment of the invention the requests sent by a device 105 sending a radio signal are encrypted.

In one embodiment of the invention the lock arrangement is adapted to perform different functions for the devices 105 sending a radio signal that are on a different side on the basis of the location of the devices.

The invention also relates to a counterpart of the lock, which counterpart can be fixed into a door frame and comprises an aperture for the locking latch 212 of the lock. Arranged into connection with the counterpart 210 of the lock are two antennas, a first antenna 213 and a second antenna 214.

In one embodiment of the invention the counterpart of the lock further comprises means 104 for receiving radio signals connected to the antennas 213, 214 and/or wherein the counterpart of the lock is adapted to determine on the basis of the signals measured from the antennas 213, 214 on which side of the counterpart of the lock the device 105 sending a radio signal is located.

In one embodiment of the invention the counterpart of the lock further comprises means 211 for sending electrical power to the means of the lock case that are for receiving electrical power.

The invention also relates to a method for detecting the presence and location of a device 105 sending a radio signal in a lock arrangement 100, 200, 400. In the method the lock arrangement 100, 200, 400 determines on the basis of the signals measured from the antennas 102, 103, 213, 214, 403 on which side of the lock arrangement the device 105 sending a radio signal is located.

It is obvious to the person skilled in the art that the different embodiments of the invention are not either limited solely to the examples described above, and that they may for these reasons be varied within the scope of the claims presented below. The characteristic features possibly presented in the description in conjunction with other characteristic features can if necessary be used separately to each other.

The invention claimed is:

1. Lock arrangement for detecting a presence and location of a device sending a radio signal, which lock arrangement comprises:
    a lock case for fixing into a door, said lock case including a locking latch and a latch mechanism;
    said lock arrangement having an inside and an outside;
    at least two antennas operatively connected with the lock arrangement and means for receiving radio signals connected to the antennas;
    wherein the lock arrangement further includes a counterpart of the lock and the at least two antennas are arranged into connection with the counterpart of the lock; and
    a comparing means for receiving radio signals and for comparing the level of the radio signal received from the at least two antennas to determine on the basis of the radio signals measured from at least one of the two antennas on which side, the inside or the outside, of the lock arrangement the device sending the radio signal is located;
    wherein the radio signal sent by the device is encrypted.

2. The lock arrangement according to claim 1, wherein the lock arrangement is adapted to communicate with the device sending the radio signal and to receive requests from the device sending a radio signal.

3. The lock arrangement according to claim 2, wherein the means for receiving radio signals is a transmitter-receiver.

4. The lock arrangement according to claim 2, wherein the antennas are directional antennas.

5. The lock arrangement according to claim 1, wherein the means for receiving radio signals is a transmitter-receiver.

6. The lock arrangement according to claim 1, wherein the antennas are directional antennas.

7. The lock arrangement according to claim 1, which further comprises means, arranged into connection with the counterpart of the lock, for wirelessly sending electrical power to the lock case and/or into connection with the lock case and means, arranged into connection with the lock case, for wirelessly receiving electrical power from the means for sending electrical power that are arranged into connection with the counterpart of the lock.

8. The lock arrangement according to claim 7, wherein the signals of the antennas and/or the information formed by the means receiving a radio signal are adapted to be transmitted from the means of the counterpart of the lock that are for sending electrical power to the means of the lock case that are for receiving electrical power, when the lock case and the counterpart of the lock are at a certain distance from each other.

9. The lock arrangement according to claim 1, wherein the antennas are disposed on opposite sides of the lock case.

10. The lock arrangement according to claim 1, wherein the antennas are aligned in such a way that one of the radiation lobes is aligned to one side of the lock arrangement and the other radiation lobe is aligned in the opposite direction to the other side of the lock arrangement.

11. The lock arrangement according to claim 1, wherein the radiation lobes of the antennas in the lock arrangement installed in connection with a door are aligned to opposite sides of the door.

12. The lock arrangement according to claim 1, wherein the means for receiving radio signals is adapted to compare the level of the signals received from the different antennas and by means of this to determine the location of the device sending a radio signal.

13. The lock arrangement according to claim 1, wherein the device sending a radio signal uses WLAN technology, Bluetooth technology and/or another short-range radio technology.

14. The lock arrangement according to claim 1, wherein the lock arrangement is adapted to perform different functions for the devices sending a radio signal that are on a different side on the basis of the location of the devices sending the radio signal.

15. A counterpart of a lock, which can be fixed into a door frame comprising:
an aperture for a locking latch of the lock, said counterpart of the lock including a first antenna and a second antenna and including an inside and an outside, said counterpart of the lock including a means for receiving radio signals;
said means for receiving radio signals being connected to the first antenna and the second antenna; and
a comparing means for receiving radio signals and for comparing the level of the signals received from the first antenna and the second antenna to determine on the basis of the radio signals measured from first antenna and the second antenna on which side, the inside or the outside, of the counterpart a device sending the radio signal is located;
wherein the radio signal sent by the device is encrypted.

16. The counterpart of a lock according to claim 15, which further comprises means for receiving radio signals connected to the antennas and/or wherein the counterpart of the lock is adapted to determine on the basis of the signals measured from the antennas on which side of the counterpart of the lock the device sending a radio signal is located.

17. The counterpart of a lock according to claim 15, which further comprises means for sending electrical power to the means of the lock case that are for receiving electrical power.

18. A method for detecting a presence and location of a device sending a radio signal in a lock arrangement wherein a lock case is fixed into a door and includes a locking latch and a latch mechanism and the lock arrangement has an inside and an outside and includes at least two antennas fitted into connection with the lock arrangement and means for receiving radio signals connected to the antennas comprising the following steps:
mounting the at least two antennas and means for receiving radio signals within a counterpart of the lock;
comparing a level of the signals received from the at least two antennas;
determining on the basis of the radio signals measured from at least one of the two antennas on which side, the inside or the outside, of the lock arrangement the device sending a radio signal is located; and
encrypting the radio signal sent by the device.

* * * * *